United States Patent
Boisselle et al.

(10) Patent No.: US 9,669,455 B2
(45) Date of Patent: Jun. 6, 2017

(54) METHOD FOR PRODUCING A HEAT EXCHANGER AND HEAT EXCHANGER OBTAINED BY SAID METHOD, SWAGE AND TUBE EXPANSION DEVICE FOR IMPLEMENTING SAID METHOD

(71) Applicant: Valeo Systemes Thermiques, Le Mesnil-Saint-Denis (FR)

(72) Inventors: Patrick Boisselle, Laval (FR); Samuel Bry, Parne sur Roc (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 74 days.

(21) Appl. No.: 14/362,413

(22) PCT Filed: Nov. 8, 2012

(86) PCT No.: PCT/EP2012/072174
§ 371 (c)(1),
(2) Date: Jun. 3, 2014

(87) PCT Pub. No.: WO2013/068488
PCT Pub. Date: May 16, 2013

(65) Prior Publication Data
US 2014/0338877 A1   Nov. 20, 2014

(30) Foreign Application Priority Data
Nov. 10, 2011 (FR) ...................................... 11 60286

(51) Int. Cl.
*B21D 53/08* (2006.01)
*F28F 1/32* (2006.01)
(Continued)

(52) U.S. Cl.
CPC ............. *B21D 53/08* (2013.01); *B21D 39/06* (2013.01); *B21D 39/08* (2013.01); *B21D 39/20* (2013.01);
(Continued)

(58) Field of Classification Search
CPC ............... F28F 2275/10; F28F 2275/12; F28F 2275/122; F28F 2275/125; F28F 1/30;
(Continued)

(56) References Cited

U.S. PATENT DOCUMENTS 5,604,982 A * 2/1997 Kent ...................... B21C 37/151
  29/727
2012/0111287 A1 * 5/2012 Williams ............... F22B 29/064
  122/32

FOREIGN PATENT DOCUMENTS

DE       93 15 296 U1    3/1994
EP       0 692 692 A1    1/1996
(Continued)

OTHER PUBLICATIONS

International Search Report for Application No. PCT/EP2012/072174 dated Jan. 21, 2013, 5 pages.
(Continued)

*Primary Examiner* — Christopher Besler
*Assistant Examiner* — Matthew P Travers
(74) *Attorney, Agent, or Firm* — Howard & Howard Attorneys PLLC

(57) ABSTRACT

A method is disclosed for producing a heat exchanger, in particular for a motor vehicle, a method whereby fluid circulation tubes (3) are inserted into through holes in heat exchange fins (4) and the fluid circulation tubes (3) are subjected to expansion in such a way as to expand a contour (22) of the tubes (3) to ensure contact with the fins (4) at the through holes and, additionally, for at least one of the tubes
(Continued)

(3), to deform a concave portion (24) of the contour (22) of the tube or tubes (3), in such a way as to correspondingly deform the through holes. A device for implementing the method and an exchanger obtained by the method are also disclosed.

9 Claims, 3 Drawing Sheets

(51) Int. Cl.
*F28F 1/12* (2006.01)
*B23P 15/26* (2006.01)
*F28D 1/053* (2006.01)
*B21D 39/06* (2006.01)
*B23P 11/00* (2006.01)
*B21D 39/08* (2006.01)
*B21D 39/20* (2006.01)

(52) U.S. Cl.
CPC ............ *B21D 53/085* (2013.01); *B23P 15/26* (2013.01); *F28D 1/05366* (2013.01); *F28F 1/12* (2013.01); *F28F 1/32* (2013.01); *F28F 1/325* (2013.01); *B23P 11/005* (2013.01); *B23P 2700/50* (2013.01); *F28F 2275/125* (2013.01); *Y10T 29/49375* (2015.01); *Y10T 29/53122* (2015.01)

(58) Field of Classification Search
CPC .... F28F 1/325; F28F 2215/08; F28F 2225/04; F28F 2225/06; F28F 1/02; F28F 1/08; B21D 53/08; B21D 53/085; B21D 39/06; B21D 53/02; B21D 53/06; B21D 15/02; B23P 11/005; B23P 15/26; B60H 1/00321; B60H 1/00328; Y10T 29/49375; Y10T 29/49378; Y10T 29/4938; Y10T 29/53122; Y10T 29/49938; Y10T 29/4994
See application file for complete search history.

(56) References Cited

FOREIGN PATENT DOCUMENTS

| GB | 2 358 242 A | 7/2001 |
|----|-------------|--------|
| JP | 59-134771 U | 9/1984 |
| JP | 2000-312938 A | 11/2000 |

OTHER PUBLICATIONS

Written Opinion of the International Searching Authority (and English translation) for Application No. PCT/EP2012/072174, 13 pages.
Machine-Assisted English translation for DE 93 15 296 extracted from the espacenet.com database on Jul. 10, 2014, 29 pages.
English language abstract and machine-assisted English translation for EP 0 692 692 extracted from espacenet.com database on Jul. 10, 2014, 13 pages.
English language abstract and machine-assisted English translation for JP 2000-312938 extracted from the PAJ database on Jul. 10, 2014, 17 pages.

* cited by examiner

METHOD FOR PRODUCING A HEAT EXCHANGER AND HEAT EXCHANGER OBTAINED BY SAID METHOD, SWAGE AND TUBE EXPANSION DEVICE FOR IMPLEMENTING SAID METHOD

CROSS-REFERENCE TO RELATED APPLICATIONS

This application is the National Stage of International Patent Application No. PCT/EP2012/072174, filed on Nov. 8, 2012, which claims priority to and all the advantages of French Patent Application No. FR 1160286, filed on Nov. 10, 2011, the content of which is incorporated herein by reference.

The present invention relates to a method for producing a heat exchanger and also a heat exchanger obtained by said method. It also relates to a swage and a tube expansion device for implementing said method.

In a preferred, but not exclusive, application the heat exchangers concerned are intended to be fitted to vehicles for use as radiators for cooling the heat engines with which these vehicles are equipped.

In automotive applications, two main types of heat exchanger are known, a first type, described as mechanical, consisting of exchangers obtained by joining their components by deformation of material, and exchangers described as brazed, consisting of exchangers obtained by joining their components by brazing.

Mechanical heat exchangers consist mainly of a cluster of parallel tubes disposed in one or more rows and in which a heat transfer fluid circulates, in our case, some glycolated water, and of a plurality of fins disposed perpendicularly to the tubes and provided with holes traversed by said tubes. The function of the fins is to increase the area of exchange with the air passing through the exchanger. In this way, an exchange of heat is obtained between the fluid circulating in the tubes and the air passing between the fins.

The fins are held on the tubes and the tubes are held on the collector plates by an expansion of the tubes. More specifically, an expansion swage is passed along the length of the tubes, inside them. The effect of the expansion swage is to deform the material of the tubes by increasing their cross-section and it thus enables them to be applied against the fins.

The heat exchange fins take the form of a plate, generally thin and rectangular, in which one or more parallel rows of identical holes are made so that the tubes can pass through perpendicularly to the plane of the plates. To ensure a proper exchange of heat, it is necessary for the contact between the tubes and the fins to be of good quality, and to be so over the entire outline of the through-holes for the tubes.

Numerous solutions have already been proposed for improving this contact, such as the formation of flanges at the periphery of the through-holes for the tubes in the fins. These flanges are formed by a raised edge of the through-holes coming into contact with the tube.

However, because of the elasticity of their material, the tubes have a residual tendency to return to the configuration that they had before expansion, particularly in the case of tubes with a complex form, more specifically tubes with outlines that have concave parts. With such tubes, it has been noted that the contact between the tubes and the fins is therefore reduced, particularly in the concave parts of the outline of the tubes, which adversely affects the exchange of heat and reduces the performance of the exchanger.

The aim of the present invention is to remedy these disadvantages and it relates first of all to a method for producing a heat exchanger, in particular a motor vehicle heat exchanger, a method in which fluid circulation tubes are introduced into through-holes of heat-exchange fins and the fluid circulation tubes are subjected to an expansion in such a way as to enlarge an outline of said tubes in order to provide a contact with said fins at said through-holes, and, additionally, for at least one of said tubes, in order to deform a concave part of the outline of said tube or tubes, so as to obtain a corresponding deformation of said through-holes.

In this way, a localised over-expansion of the tubes is produced, which creates areas of forced contact between the tubes and the outline of the through-holes. Thus, the risk of poor contact with the fins, because of a partial return of the tubes to their state before expansion, is reduced. In addition, the section for passage of the fluid is increased, which reduces friction loss in the exchanger.

According to different embodiments of the invention, which can be taken together or separately:
- said expansion is configured in such a way as to create one or more protuberances, projecting towards the fins, causing said deformation of the through-holes that is provided for in the concave part of the tube;
- said protuberance or protuberances are produced by deformation of the material of the tube;
- the protuberance or protuberances take the form of a fold in the material of the tube;
- the fold is shaped as a dihedron with a rounded peak;
- the protuberance or protuberances extend along a longitudinal axis of the tubes;
- the protuberance or protuberances are situated in a middle part of said concave part;
- the tubes comprise two large faces connected by lateral sides of the tube, each of the large faces being provided with a part described as concave, each part described as concave being provided with one or more of said protuberances;
- the fins are provided, at said through-holes, with flanges intended to increase the area of contact with the tubes and said expansion is configured to deform said flanges;
- before expansion, the through-holes of the fins have an outline whose shape is homologous with that of the outline of the tubes.

The invention also relates to a heat exchanger obtained by implementing the method of production described above.

The invention also relates to an expansion swage and a tube expansion system, comprising said swage, for implementing said method.

Said swage has an outline configured to subject a fluid circulation tube to an expansion in such a way as to enlarge an outline of said tube and, additionally, to obtain a deformation of a concave part of the outline of the tube.

Said swage comprises, for example, at least one rib at a concave part of the outline of said swage, said rib or ribs making it possible to produce said deformation of a concave part of the tube.

The appended drawings will give a clear understanding of the way in which the invention can be embodied. In these drawings, identical references designate similar elements.

Figure 1:
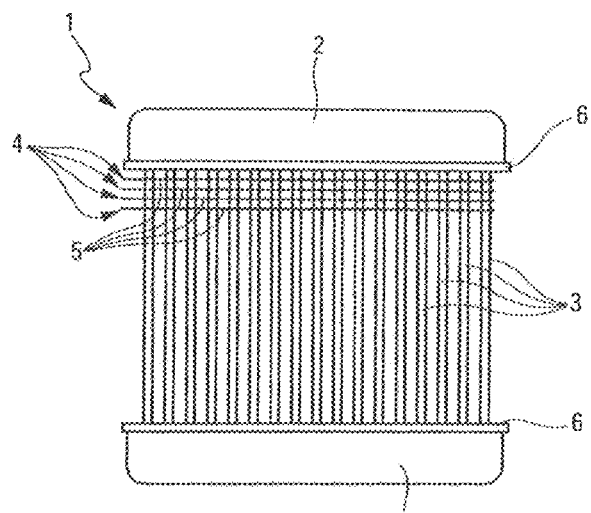
FIG. 1 is a plane diagrammatic view of a mechanical heat exchanger equipped according to the invention with tubes and cooling fins.

As shown in FIG. 1, the invention relates to a heat exchanger 1 of a mechanical type and consists principally of a cluster of tubes 3, in which a heat transfer fluid circulates, and of cooling or heat dissipation fins 4, traversed by the tubes 3. It also comprises, in particular, two extremity collector boxes 2 spaced parallel to one another and connected by the tubes 3. These tubes are, for example, aligned in parallel and the fins 4, intended to be parallel to one another, are disposed perpendicularly to said tubes 3.

In brief, in the case of an application as a cooling radiator for the engine of a motor vehicle, the heat transfer fluid that has come out of the tubes passes via one of the collector boxes and is conveyed, via a supply pipe, to the different hot components of the engine (engine block, cylinder head, etc.) that are to be cooled and, being then reheated, is returned via a return pipe to the other collector box of the radiator in order to circulate in the tubes once again. Also, the exchange of heat between the heat exchange fluid circulating in the tubes of the exchanger and an external fluid (for example ambient air) passing between said tubes to lower the temperature of the heat exchange fluid, is promoted by the presence of fins whose form, number and material are chosen so as to optimise the elimination of a significant amount of heat with the aim of progressively bringing the heat exchange fluid passing through the exchanger to a temperature range that is acceptable and efficient for cooling the engine.

More specifically, the two collector boxes 2 are placed in fluid communication via the aligned tubes 3 whose extremities are here connected in a fixed and sealed manner to respective plates 6 of the boxes, and in which the heat exchange fluid circulates from one box to the other. This fluid is, for example, glycolated water where the exchanger 1 acts as a cooling radiator for a heat engine, as in the present instance. The fluid supply and return connections provided in the respective boxes leading to and returning from the engine have not been shown.

The heat exchange fins 4 are disposed transversely to these aligned tubes 3 between the hot fluid to be cooled that is circulating in the tubes and the cool ambient air outside. These fins 4 are structurally identical to one another and are disposed parallel to one another, being separated from one another by a pitch that is advantageously constant. The plane dimensions of the fin correspond approximately to those of the collector boxes 2 in order to ensure that the heat exchanger 1 is compact.

Figure 2A:
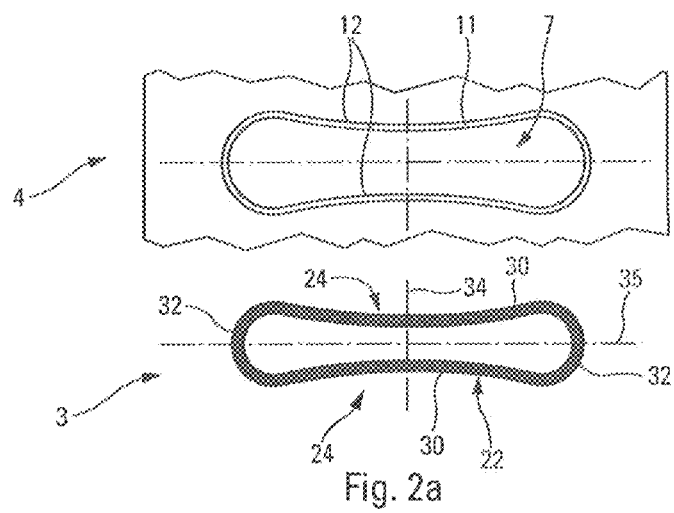
FIGS. 2a to 2c are diagrammatic illustrations of the different steps of an example of implementation of the method according to the invention, showing a tube cut transversely and a portion of a fin.
Figure 2B:
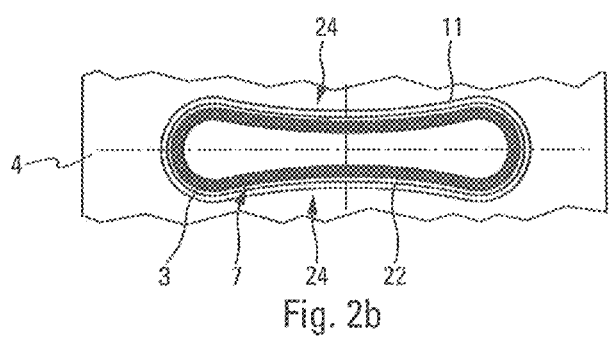
Figure 2C:
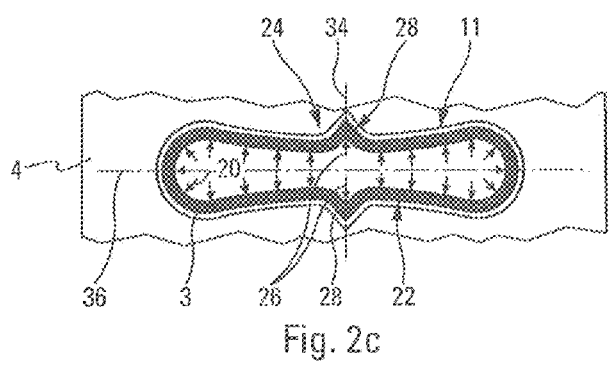

As illustrated in FIGS. 2a to 2c, the invention also relates to a method for producing a heat exchanger like that described above.

FIG. 2a shows a fin 4 (above) and a tube 3 (below), before they are fitted to one another. Although only a single hole 7 and a single tube 3 are shown here, said through-holes 7 of a single fin and said tubes 3 of a single cluster will be, for example, respectively identical.

The fins 4 take the form, for example, of a plate or thin sheet, generally rectangular, less than one tenth of a millimeter thick. They are obtained, in particular, by drawing. The material of which the fins 4 are made is in general a metal alloy, for example an alloy of aluminium (or copper) because of its capacity for heat exchange. Each fin 4 has holes 7 for the tubes 3 to pass through.

Said tubes 3 are, for example, made of a metal alloy such as an alloy of aluminium (or copper). They are obtained, in particular, by electric welding or by extrusion.

As shown in FIG. 2b, the tubes 3 are first of all introduced into the through-holes 7 of the fins 4. It will be seen from this drawing that the tubes 3 then have a smaller section than that of the through-holes 7, thus enabling the tubes 3 to be introduced into the through-holes 7 with slight play, preventing the fins from being deformed during this step.

As shown in FIG. 2c, the fluid circulation tubes 3 are then subjected to an expansion, in accordance with the arrows referenced 20, in such a way as to enlarge an outline 22 of said tubes 3 in order to provide a contact with said fins 4 at said through-holes 7. In other words, the transverse section of the tubes 3 is increased. This expansion is produced, for example, over the entire outline 22 of said tubes 3. It may lead to a deformation of the through-holes.

According to the invention, said expansion serves, additionally, to deform a concave part 24 of the outline of said tubes 3, in such a way as to obtain a corresponding deformation of said through-holes 7. Thus a local deformation is produced in the section of said tubes 3 whose outline, after expansion, is not a homothety of the outline before expansion. The arrows referenced 26 are used to show this over-expansion that the tube 3 undergoes at its concave part or parts 24.

Said expansion is configured in such a way as to create, for example, one or more than one protuberance 28, projecting towards the fins 4, causing said deformation of the through-holes 7 provided in the concave part or parts 24 of the tube. Said protuberance or protuberances 28 are produced, in particular, by deformation of the material of the tube.

Said protuberance or protuberances 28 take the form, for example, of a fold in the material of the tube 3 which can be shaped as a dihedron with a rounded peak.

Said protuberance or protuberances 28 here extend along a longitudinal axis of the tubes 3. They are situated in a middle part of said concave part. "Middle part" is understood to mean the part of the outline 22 of the tube 3 that projects furthest towards the inside of the tube, before expansion.

The tubes 3 comprise, for example, two large faces 30 connected by lateral sides 32, in particular rounded lateral sides of the tube 3. Each of the large faces 30 is here provided with a part described as the concave part 24 of the outline 22. Said concave parts 24 can be approximately symmetrical relative to a first plane perpendicular to the planes tangential to the outline 22 of the tube 3 and passing through the middle of said concave parts 24, here the plane perpendicular to the page of drawings and passing through the axis of symmetry 34. The tubes 3 can have a second plane of symmetry 36, situated between said planes tangential to the outline 22 of the tube 3 and passing through the middle of the concave parts 24.

Said tubes 3 have, for example, an elongated section, in particular an oblong section, from one lateral side 32 to the other. Said tubes 3 can be of a constant section, at least in the central part of the cluster, in other words, in the part of the cluster provided with the fins 4.

As is more clearly apparent in FIG. 2a, before expansion, the through-holes 7 of the fins can have an outline whose shape is homologous to that of the outline of the tubes. A "homologous" shape is understood to mean that the shape of the tubes 3 is homothetic with that of the through-holes 7, the section of the tubes before expansion being, as has already been said, smaller than that of the through-holes to facilitate the insertion of said tubes 3 into the fins 4.

In other words, the through-holes 7 are arranged in the widthways direction of the fins 4 and comprise two large sides 12 connected to one another by two rounded extremity edges that match the semicircular lateral sides 32 of the tubes 3.

After expansion, each part described as the concave part 24 can be provided with one or more protuberances 28. Said protuberances 28 are disposed, for example, symmetrically relative to the second plane of symmetry 36 of the tube 3. In particular, a single protuberance 28 is provided on each concave part 24, at the first plane of symmetry 34 of the tube. In some variants that are not illustrated, a plurality of protuberances 28 are provided on one and/or each of the large sides of the tubes 3, protuberances that may be out of alignment between one side and the other.

The fins 4 can be provided, at said through-holes 7, with flanges 11 intended to increase the area of contact with the tubes 3 and said expansion is configured so as to deform said flanges 11. More specifically, during the expansion, said flanges 11 are deformed at least at the protuberance or protuberances 28. Thus they have a matching hollow shape.

Each oblong hole 7 is here delimited, over its entire periphery, by said flanges 11 produced via standard mechanical cutting and folding operations (or drawing) of the material of the fin itself and projecting perpendicularly from the fin.

Figure 3:
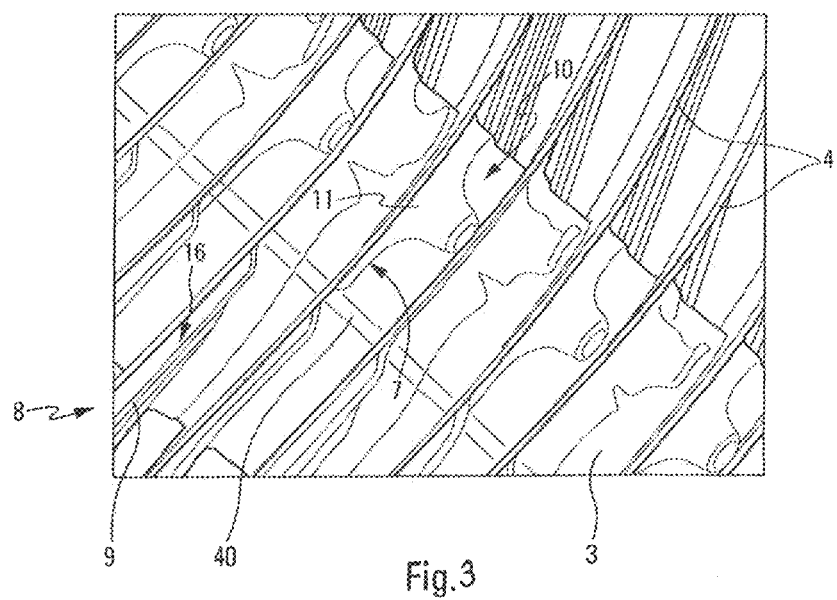
FIG. 3 is a perspective view showing a part of a tube and of the fins of the heat exchanger obtained by the method shown in FIGS. 2a-2c.

As illustrated in FIG. 3, the fins can also comprise shutters 8 with angled slats 9 for the forced circulation of cooling ambient air, and spacing means 10 embodying the pitch between the fins 4 and of the same material as said fins.

The shutters 8 (also called deflectors) with angled slats 9 are provided between two consecutive oblong holes 7 and their function is to deflect and disturb the flow of cool ambient air coming from the outside, in order to bring it between the fins 4 so as to participate actively in the thermal exchanges with the tubes 3 in order to cool the exchanger and its heat exchange fluid. Each shutter 8 comprises a series of successive parallel slats 9, oriented along the length of the fin. And these slats 9 are mainly obtained by appropriate partial cutting of the fin 4, and then by folding (or drawing) in such a way as to form a chosen angle of inclination relative to the fin from which they have originated, thus creating openings 16 in the fin for the channelled circulation of air from one fin to another.

The tubes 3 have one or more than one rib 40 elongated along the longitudinal axis of the tubes 3 in contact with through-holes of the fins. Said rib or ribs 40 correspond to the protuberances 28 resulting from the expansion of the tubes 3.

Figure 4:
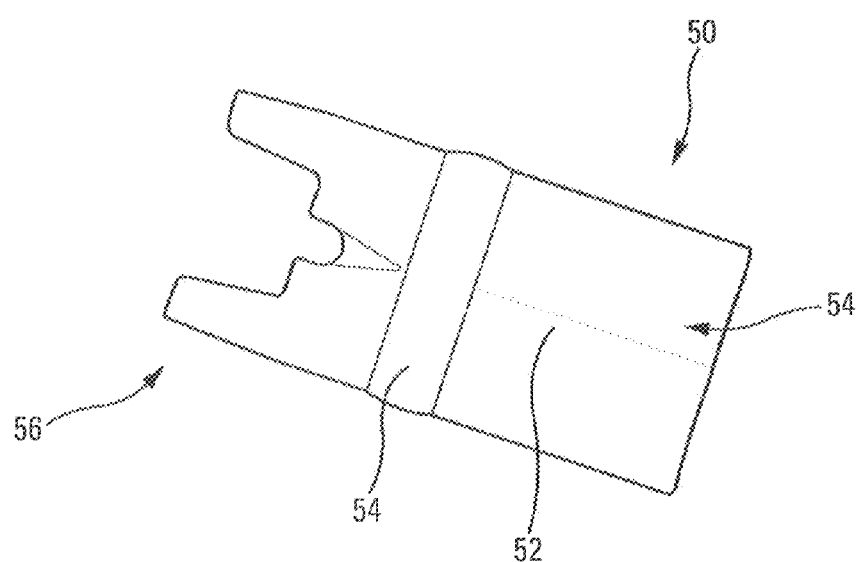
FIG. 4 is a perspective view of an example of an expansion swage used to implement the method shown in FIGS. 2a-2c.

As shown in FIG. 4, the invention also relates to an expansion swage 50 for implementing the method described above.

Said swage 50 has an outline configured to subject the fluid circulation tubes to an expansion in such a way as to enlarge the outline of the tubes and, additionally, to deform the concave part or parts of the outline of the tubes. In order to do this, after the tubes have been introduced into the fins, swages 50 of this kind are caused to circulate in each of the tubes from one of their extremities to the other.

Said swage 50 comprises at least one rib 52 at a concave part 54 of the outline of said swage, said rib or ribs 52 making it possible to produce the deformation of the con-cave part or parts of the tube. In other words, the outline of said swage 50 is homologous to that of the tubes 3 after expansion.

Said swage can have a part 54 with additional thickness causing the tubes 3 to expand. One of the extremities 56 of the swage is here configured in such a way as to facilitate the introduction and the progression of the swage in the tubes.

The invention also relates to a tube expansion device using said swage. Apart from the swage, a device of this kind, not shown, is known to the person skilled in the art. It comprises an assembly table configured to receive and hold the fins parallel to one another, their through-holes for the tubes being placed respectively in line with one another. It also comprises means for introducing and guiding the swages in the tubes.

Once the fins are positioned and held on the table, the tubes are introduced into the fins and then the means for introducing and guiding the swages in the tubes is actuated to cause said tubes to expand. A heat exchange cluster is then formed onto which the collector boxes can be connected according to any method known to the person skilled in the art.

The invention claimed is:

1. A method for producing a heat exchanger, comprising:
   introducing fluid circulation tubes (3) into through-holes (7) of heat-exchange fins (4);
   expanding the fluid circulation tubes (3) to enlarge an outline (22) of said tubes (3) in order to provide a contact with said fins (4) at said through-holes (7), wherein said expanding further comprises:
   for at least one of said tubes (3), deforming a concave part (24) of the outline (22) of said tube or tubes (3) extending in a first direction such that the concave part (24) remains concaved, so as to obtain a corresponding deformation of said through-holes;
   and creating one or more protuberances (28) projecting in a second direction opposite the first direction towards the fins (4), causing a deformation of the through-holes (7).

2. The method according to claim 1 in which the one or more protuberances are provided for in the concave part (24) of the tube (3).

3. The method according to claim 2 in which the protuberance or protuberances (28) take the form of a fold in the material of the tube.

4. The method according to claim 3 in which the fold is shaped as a dihedron with a rounded peak.

5. The method according to claim 2 in which said protuberance or protuberances (28) extend along a longitudinal axis of the tubes (3).

6. The method according to claim 2 in which said protuberance or protuberances (28) are situated in a middle part of said concave part (24).

7. The method according to claim 2 in which the tubes (3) comprise two large faces (30) connected by lateral sides (32) of the tube, each of the large faces (30) being provided with a part (24) of the outline (22) being concave, and in which each part being concave (24) is provided with one or more of said protuberances (28).

8. The method according to claim 1 in which, before expansion, the through-holes (7) of the fins (4) have an outline whose shape is homologous with that of the outline (22) of the tubes (3).

9. The method according to claim 1 in which the fins (4) are provided, at said through-holes (7), with flanges (11) that increase the area of contact with the tubes (3) and said expansion is configured to deform said flanges (11).

* * * * *